US008068686B2

(12) United States Patent
 Toyoda (10) Patent No.: US 8,068,686 B2
(45) Date of Patent: Nov. 29, 2011

(54) IMAGE RECORDING APPARATUS, IMAGE RECORDING METHOD, IMAGE PROCESSING APPARATUS, IMAGE PROCESSING METHOD AND IMAGE PROCESSING SYSTEM

(75) Inventor: Tetsuya Toyoda, Hachioji (JP)

(73) Assignee: Olympus Corporation, Tokyo (JP)

( * ) Notice: Subject to any disclaimer, the term of this patent is extended or adjusted under 35 U.S.C. 154(b) by 512 days.

(21) Appl. No.: 11/141,544

(22) Filed: May 31, 2005

(65) Prior Publication Data

US 2005/0280716 A1 Dec. 22, 2005

(30) Foreign Application Priority Data

Jun. 10, 2004 (JP) ................................ 2004-172578

(51) Int. Cl.
 *H04N 5/228* (2006.01)
(52) U.S. Cl. ...... 382/254; 382/167; 382/274; 348/223.1; 348/224.1; 348/225.1; 348/645; 348/649; 348/663; 348/687; 345/213; 345/589; 345/601
(58) Field of Classification Search .................... 382/254
 See application file for complete search history.

(56) References Cited

U.S. PATENT DOCUMENTS

| 5,719,624 | A | * | 2/1998 | Sasaki et al. ............... 348/231.3 |
|---|---|---|---|---|
| 6,515,698 | B1 | * | 2/2003 | Sasaki et al. ............... 348/231.6 |
| 6,781,716 | B1 | * | 8/2004 | Yoda ............................. 358/1.9 |
| 2001/0043368 | A1 | * | 11/2001 | Morikawa ...................... 358/458 |
| 2002/0031277 | A1 | * | 3/2002 | Lubin et al. .................... 382/254 |
| 2002/0080379 | A1 | * | 6/2002 | Iwaki ........................... 358/1.13 |
| 2003/0165266 | A1 | * | 9/2003 | Kagawa et al. ............... 382/166 |
| 2005/0249403 | A1 | * | 11/2005 | Haikin ......................... 382/162 |

* cited by examiner

*Primary Examiner* — John W Lee
(74) *Attorney, Agent, or Firm* — Straub & Pokotylo; John C. Pokotylo (57) ABSTRACT

An image recording apparatus includes an imaging section which images a subject to obtain imaging data. An image quality information acquiring section acquires a plurality of sets of information concerning image quality. An image quality information converting section converts the plurality of sets of information concerning the image quality acquired in the image quality information acquiring section into image processing parameters used in image processing of the imaging data. An image processing section performs image processing with respect to the imaging data based on the image processing parameters converted by the image quality information converting section. A recording section records in a recording medium the imaging data subjected to image processing in the image processing section, or records in the recording medium the imaging data which is not yet subjected to image processing in the image processing section and the plurality of sets of information concerning the image quality.

11 Claims, 5 Drawing Sheets

IMAGE RECORDING APPARATUS, IMAGE RECORDING METHOD, IMAGE PROCESSING APPARATUS, IMAGE PROCESSING METHOD AND IMAGE PROCESSING SYSTEM

CROSS-REFERENCE TO RELATED APPLICATIONS

This application is based upon and claims the benefit of priority from prior Japanese Patent Application No. 2004-172578, filed Jun. 10, 2004, the entire contents of which are incorporated herein by reference.

BACKGROUND OF THE INVENTION

1. Field of the Invention

The present invention relates to an image recording apparatus, an image recording method, an image processing apparatus, an image processing method and an image processing system.

2. Description of the Related Art

In conventional digital cameras, there has been known a digital camera provided with a function which directly records imaging data which has not yet been subjected to image processing (such data will be referred to as raw data hereinafter) in a recording medium or the like. Raw data is obtained by simply converting an output from an imaging element into digital data without performing image processing. Therefore, if the raw data remains unchanged, it cannot be viewed or printed as an image. In this sense, it is premised that the raw data is subjected to image processing in an image processing application in a dedicated image processing apparatus or on a PC.

Usually, when performing image processing of the raw data in an image processing apparatus or the like, image quality information (e.g., white balance information) required for the image processing must be transmitted from a digital camera to an image processing apparatus. Specifically, for example, image quality information required for the image processing is recorded in header information of an image file having raw data, and this image file is transmitted to an image processing apparatus. As an example, U.S. Pat. No. 5,719,624 proposes a technique which records an image signal from an imaging element without performing color conversion and also records a matrix calculation constant or the like which is used in a matrix calculation so that such a signal or constant can be used in reproduction of an image.

BRIEF SUMMARY OF THE INVENTION

According to a first aspect of the present invention, there is provided an image recording apparatus comprising:

an imaging section which images a subject to obtain imaging data;

an image quality information acquiring section which acquires a plurality of sets of information concerning image quality;

an image quality information converting section which converts the plurality of sets of information concerning the image quality acquired in the image quality information acquiring section into image processing parameters used in image processing of the imaging data;

an image processing section which performs image processing with respect to the image data based on the image processing parameters converted in the image quality information converting section; and a recording section which performs at least one of recording an imaging data after the image processing in the image processing section in a recording medium, and recording an imaging data before the image processing in the image processing section and the plurality of sets of information concerning the image quality in the recording medium.

According to a second aspect of the present invention, there is provided an image recording apparatus comprising:

an imaging section which images a subject to obtain imaging data;

an image quality acquiring section which acquires a plurality of sets of information concerning image quality;

an image processing section which performs image processing with respect to the imaging data acquired in the imaging section; and a recording section which records in a recording medium the plurality of sets of information concerning the image quality as information which is converted into image processing parameters having a plurality of image processing conformations together with an imaging data before the image processing in the image processing section.

According to a third aspect of the present invention, there is provided an image recording method comprising:

imaging a subject to obtain imaging data;

acquiring a plurality of sets of information concerning an image quality which is converted into image processing parameters used in image processing of the imaging data; and recording the imaging data and the plurality of sets of information concerning the image quality.

According to a forth aspect of the present invention, there is provided an image processing apparatus comprising:

an input section which is input imaging data before image processing and a plurality of sets of information concerning image quality;

at least one image quality information converting section which converts the plurality of sets of information concerning the image quality input by the input section into image processing parameters corresponding to an image processing conformation when performing image processing with respect to the imaging data; and at least one image processing section which performs the image processing with respect to the imaging data based on the image processing parameters converted by the image quality information converting section.

According to a fifth aspect of the present invention, there is provided an image processing apparatus comprising:

an input section which is input imaging data before image processing and a plurality of sets of information concerning image quality recorded as information which can be converted into image processing parameters complying with a plurality of image processing conformations;

at least one image quality information converting section which converts the plurality of sets of information concerning the image quality input by the input section into image processing parameters corresponding to an image processing conformation when performing image processing with respect to the imaging data; and at least one image processing section which performs image processing with respect to the imaging data based on the image processing parameters converted by the image quality information converting section.

According to a sixth aspect of the present invention, there is provided an image processing method comprising:

inputting imaging data before image processing and a plurality of sets of information concerning image quality;

converting the plurality of sets of input information concerning the image quality into image processing parameters corresponding to an image processing conformation when performing image processing with respect to the imaging data; and performing image processing with respect to the imaging data based on the converted image processing parameters.

According to a seventh aspect of the present invention, there is provided an image processing system comprising:
an image recording apparatus comprising:
an imaging section which images a subject to obtain imaging data;
an image quality information acquiring section which acquires a plurality of sets of information concerning image quality; and
a recording section which records the plurality of sets of information concerning the image quality acquired in the image quality information acquiring section together with the imaging data in a recording medium; and
an image processing apparatus comprising:
an input section which is input the imaging data and the plurality of sets of information concerning the image quality recorded in the recording medium;
at least one image quality information converting section which converts the plurality of sets of information concerning the image quality input by the input section into image processing parameters corresponding to an image processing conformation when performing image processing with respect to the imaging data; and
at least one image quality information converting section which performs image processing with respect to the imaging data based on the image processing parameters converted by the image quality information converting section.

According to an eighth aspect of the present invention, there is provided an image processing system comprising:
an image recording apparatus comprising:
an imaging section which images a subject to obtain imaging data before image processing;
an image quality information acquiring section which acquires a plurality of sets of information concerning image quality; and
a recording section which simultaneously records in a recording medium the imaging data before image processing obtained in the imaging section and the plurality of sets of information concerning the image quality acquired in the image quality information acquiring section; and
an image processing apparatus comprising:
an input section which is input the imaging data before image processing and the plurality of sets of information concerning the image quality;
at least one image quality information converting section which converts the plurality of sets of information concerning the image quality input by the input section into image processing parameters corresponding to an image processing conformation when performing image processing with respect to the imaging data; and
at least one image processing section which performs image processing with respect to the imaging data based on the image processing parameters converted by the image quality information converting section.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment according to the present invention will now be described hereinafter with reference to the accompanying drawings.

Figure 1:
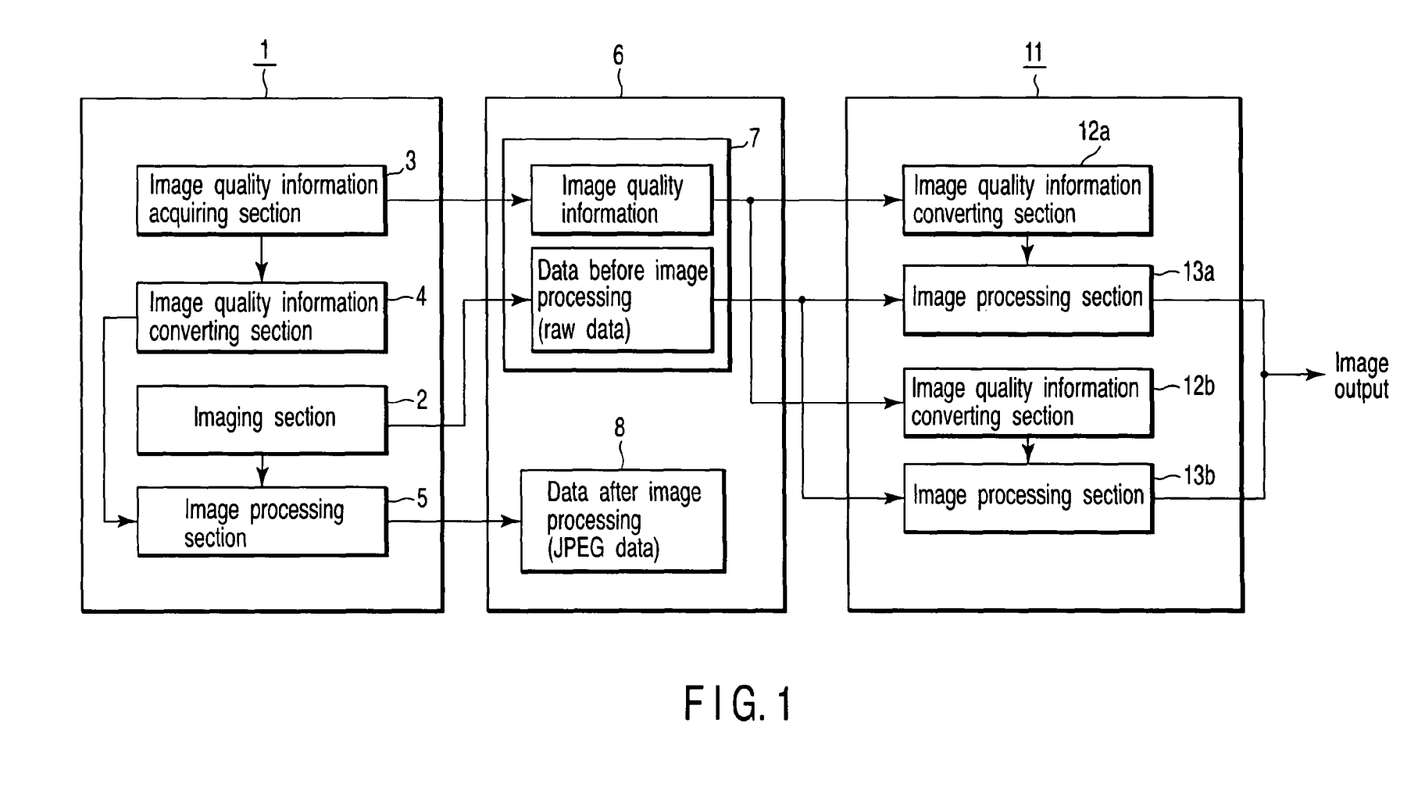
FIG. 1 is a block diagram of an image processing system according to an embodiment of the present invention.

FIG. 1 is a block diagram showing a conceptual configuration of an image processing system according to an embodiment of the present invention. The image processing system depicted in FIG. 1 comprises an image recording apparatus 1, a recording medium 6, and an image processing apparatus 11.

The image recording apparatus 1 will be first described. This image recording apparatus 1 has two recording modes. One recording mode is a recording mode which directly records imaging data (raw data) obtained by imaging a subject in the recording medium 6 as raw data without performing image processing. The other recording mode is a recording mode which records the raw data in the recording medium 6 after performing image processing.

Such an image recording apparatus 1 comprises an imaging section 2, an image quality information acquiring section 3, an image quality information converting section 4, and an image processing section 5 as shown in FIG. 1.

The imaging section 2 performs imaging of a non-illustrated subject in order to obtain raw data. The image quality information acquiring section 3 acquires a plurality of sets of information concerning image quality (which will be referred to as image quality information hereinafter) which can be converted into image processing parameters required when performing image processing with respect to raw data. In this example, the image quality information includes information which is previously recorded in the image recording apparatus 1 and information obtained at the time of imaging raw data. The details of such image quality information will be described later.

The image quality information converting section 4 converts the image quality information acquired in the image quality information acquiring section 3 into image processing parameters which are used when performing image processing in the image processing section 5. The image processing section 5 carries out image processing of raw data in a predetermined image processing conformation using the image processing parameters converted in the image quality information converting section 4.

In such an image recording apparatus 1, if the recording mode is set to the recording mode which directly records raw data in the recording medium 6 without effecting image processing, one file 7 in which the image quality information is added to the raw data (which will be referred to as a RAW file hereinafter) is recorded in the recording medium 6. The RAW file recorded in the recording medium 6 in this manner can be transmitted to the image processing apparatus 11 side. In this example, although the raw data and the image quality information are recorded as one file 7 in FIG. 1, the raw data and the image quality information may be recorded as different files so that the raw data and the image quality information can be associated with each other.

On the other hand, if the recording mode is set to the recording mode which records the raw data in the recording medium 6 after performing image processing, image-processed data (e.g., Joint Photographic Experts Group [JPEG] data) 8 processed in the image processing section 5 is recorded in the recording medium 6.

The image processing apparatus 11 will now be described. This image processing apparatus 11 is configured to be able to perform image processing with respect to raw data in two types of image processing conformations. As shown in FIG. 11, the image processing apparatus 11 comprises image quality information converting sections 12*a* and 12*b* and image processing sections 13*a* and 13*b*. In this example, the operations of the image quality information converting sections 12*a* and 12*b* and the operations of the image processing sections 13*a* and 13*b* are the same as the operations of the image quality information converting section 4 and the image processing section 5 on the image recording apparatus 1 side, respectively. That is, the image quality information converting sections 12*a* and 12*b* read image quality information from the input RAW file 7, and convert the read image quality information into image processing parameters which are used in corresponding image processing sections. The image processing sections 13*a* and 13*b* perform image processing of the raw data by using the image processing parameters converted in corresponding image quality information converting sections. The processed image is output by, e.g., printing or display.

Each configuration in the image processing system depicted in FIG. 1 will now be further described in detail.

Figure 2:
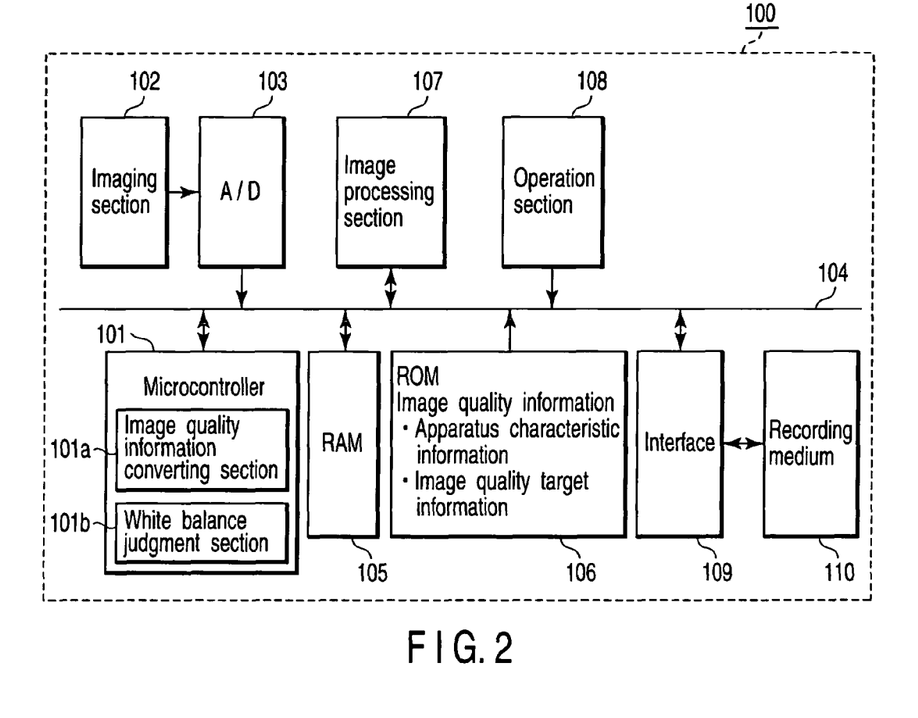
FIG. 2 is a block diagram of a digital camera as an example of an image recording apparatus according to an embodiment of the present invention.

FIG. 2 is a block diagram showing a main configuration of a digital camera as an example of the image recording apparatus depicted in FIG. 1. A digital camera (which will be referred to as a camera hereinafter) 100 shown in FIG. 2 comprises a microcontroller 101, an imaging section 102, an analog-to-digital converting section 103, a bus line 104, a RAM 105, a ROM 106, an image processing section 107, an operation section 108, a recording interface 109 and a recording medium 110.

The microcontroller 101 executes general controls in the camera 100, e.g., an operation control of the imaging section 102 or a recording control of image data. In this example, the microcontroller 101 also has a function of an image quality information converting section 101*a* which converts image quality information into image processing parameters and a function of a white balance judgment section 101*b* which makes a later-described white balance (WB) judgment.

The imaging section 102 comprises, e.g., an imaging lens or an imaging element (CCD), and performs an imaging operation for a non-illustrated subject to obtain an imaging signal.

The analog-to-digital converting section 103 converts an analog imaging signal output from the imaging section 102 into digital imaging data (i.e., raw data), and outputs the thus obtained raw data to the bus line 104.

To the bus line 104 are connected the microcontroller 101, the RAM 105, the ROM 106, the image processing section 107, the operation section 108 and the recording interface 109 as well as the analog-to-digital converting section 103, and the bus line 104 transmits various kinds of data such as raw data to each circuit of the camera 100.

The RAM 105 is a memory which temporarily stores data such as raw data or results of various kinds of calculations executed in the camera 100. Further, the ROM 106 is a memory which stores various kinds of control programs which are executed by the microcontroller 101 and an adjustment value inherent to each camera.

In this example, image quality information is further stored in the ROM 106 according to this embodiment. This image quality information stored in the ROM 106 is basic information which is not dependent on an image processing conformation of the image processing section, and includes information concerning apparatus characteristics of the imaging section 102 (apparatus characteristic information) and information concerning an image quality target (image quality target information).

A description will now be given as to the apparatus characteristic information and the image quality target information stored in the ROM 106. As the image quality information, there is information obtained when imaging a subject besides the apparatus characteristic information and the image quality target information previously stored in the ROM 106, but the information obtained when imaging a subject will be described later.

First, the apparatus characteristic information includes a Camera RGB-Calibrated RGB conversion matrix (A), a Calibrated RGB-CIEXYZ conversion matrix (B) and lens MTF information (G) of the imaging lens.

The Camera RGB-Calibrated RGB conversion matrix (A) is a conversion matrix inherent to each camera which is used to convert raw data (camera RGB data) obtained in the analog-to-digital converting section 103 into predetermined raw data (calibrated RGB data). In this example, the calibrated RGB data is raw data with irregularities in spectral responsivity of each imaging element being absorbed.

The Calibrated RGB-CIEXYZ conversion matrix (B) is a conversion matrix which is used to map the calibrated RGB data onto a CIEXYZ color space. This conversion matrix has a relationship represented by (Expression 1).

$$X=2.77R+1.75G+1.13B$$

$$Y=R+4.59G+0.060B$$

$$Z=0R+0.057G+5.59B \quad \text{(Expression 1)}$$

where R, G and B are respective color components of the calibrated RGB data.

The lens modulation transfer function (MTF) information (G) of the taking lens indicates contrast characteristics of an image transmitted through the imaging lens as a function of a spatial frequency. This lens MTF information (G) is also information inherent to each camera.

Furthermore, the image quality target information includes a gradation conversion lookup table (LUT) (D), a color saturation emphasis quantity (E), a hue conversion quantity (F) and a spatial frequency response (SFR) target value (H).

The gradation conversion LUT (D) is a lookup table which is referred when performing gradation conversion processing. The gradation conversion LUT (D) in this embodiment is a gradation conversion LUT in the RGB color space.

The color saturation emphasis quantity (E) is a color saturation emphasis quantity of an image. The color saturation emphasis quantity in this embodiment is determined as a gain value of color difference data Cr and Cb. Moreover, the hue conversion quantity (F) is a hue conversion quantity of an image. The hue conversion quantity in this embodiment is determined as a rotation angle quantity of the color difference data Cr and Cb.

The SFR target value is a target value of the spatial frequency response, i.e., a contrast target value demanded for an image.

Here, the camera 100 will be again described. The image processing section 107 performs image processing of the raw data which is output from the analog-to-digital converting section 103 and input through the bus line 104. As the image processing executed in this image processing section 107, there are, e.g., simultaneous processing, white balance (WB) adjustment processing, color conversion processing, gradation conversion processing, brightness/color difference conversion processing, sharpness processing, JPEG compression processing and others. These kinds of image processing will be described later.

The operation section 108 comprises an operation member which is used to be performed various kinds of operations of the camera 100 by a user, and a detection section which detects an operation state of this operation member. A detection result of the operation state of the operation member is input to the micro-controller 101, and the microcontroller 101 executes a predetermined program based on this result.

The recording interface 109 is a communication interface between the camera 100 and the recording medium 110. In this example, as the recording medium 110, a card type recording medium which is attachable from the camera 100 is used, for example.

Figure 3:
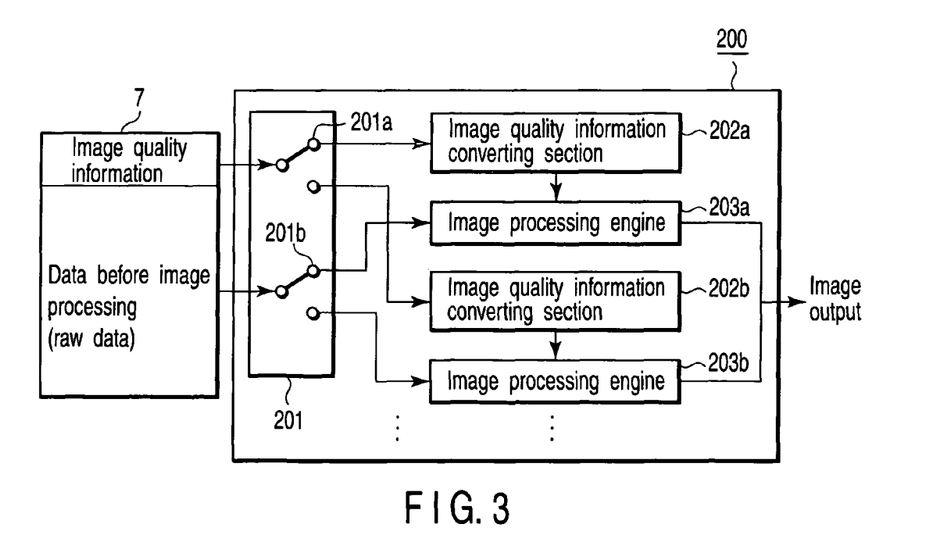
FIG. 3 is a block diagram showing an example of an image processing apparatus according to an embodiment of the present invention.

FIG. 3 is a block diagram showing a configuration of an example of the image processing apparatus depicted in FIG. 1. Functions of this image processing apparatus can be realized by, e.g., application software for image processing installed on a PC. The image processing apparatus 200 shown in FIG. 3 comprises a selective switch section 201, image quality information converting sections 202a and 202b, and image processing engines 203a and 203b. It is to be noted the number of each of image quality information converting sections and the image processing engines may be larger than two.

The selective switch section 201 comprises a switch 201a which selectively switches the image quality converting sections and a switch 201b which selectively switches the image processing engines. When a user changes over the switch 201b of the selective switch section 201 and one of the image processing engines is selected, the switch 201a is changed over so that the image quality information converting section corresponding to the selected image processing engine can be automatically selected. The image quality information converting section selected here converts image quality information recorded in a RAW file into image processing parameters corresponding to an image processing conformation of the corresponding image processing engine.

In this example, the selective switch section 201 may be constituted as a hardware switch or a software switch.

A description will now be given as to image recording processing in the camera 100 depicted in FIG. 2 with reference to a flowchart of FIG. 4.

Figure 4:
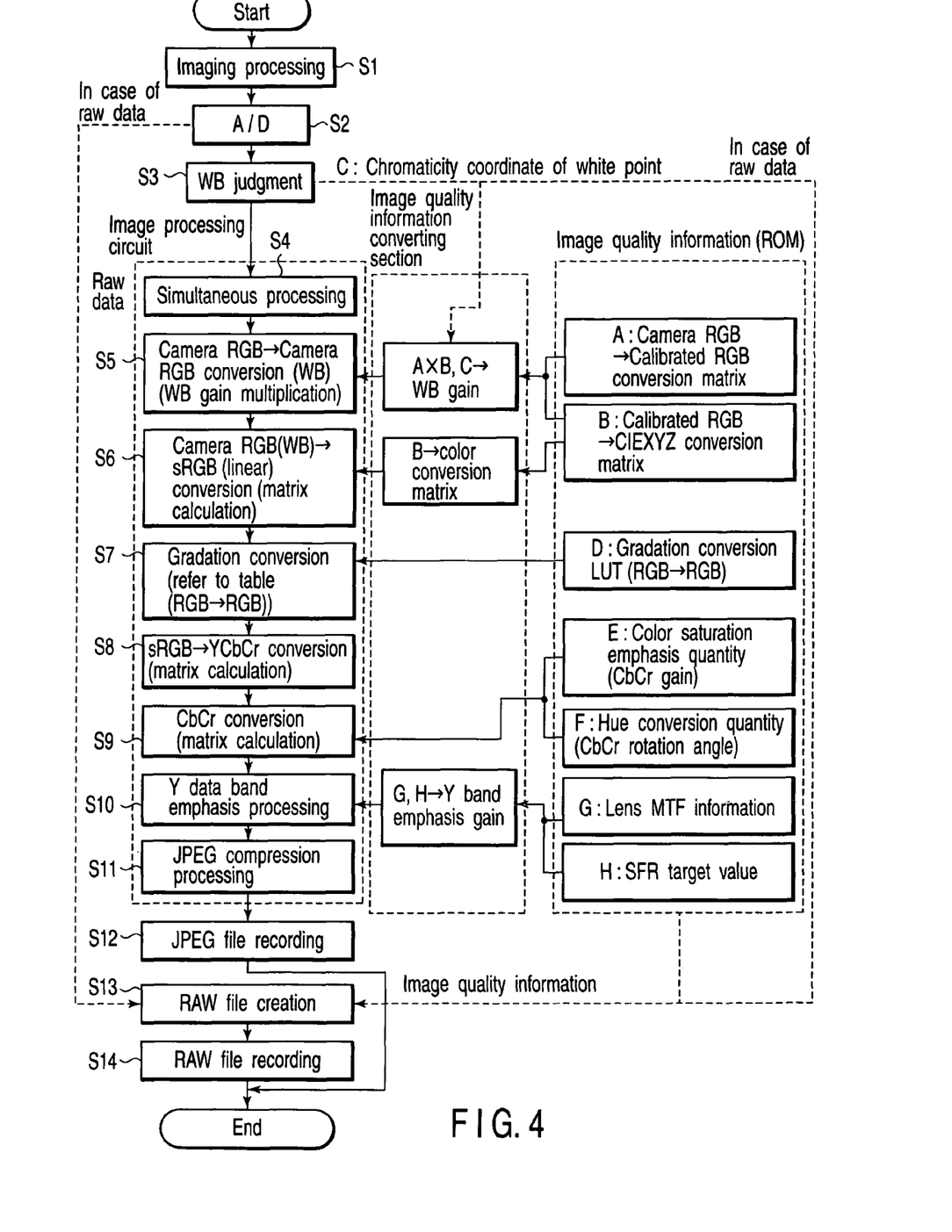
FIG. 4 is a flowchart showing image recording processing on a digital camera side.

In FIG. 4, the imaging section 102 first images a non-illustrated subject to obtain an imaging signal (step S1). Then, the analog-to-digital converting section 103 digitizes the imaging signal obtained in the imaging section 102 (step S2). As a result, raw data is obtained. Thereafter, different processing is carried out depending on the recording mode which directly records the raw data in the recording medium or the recording mode which records the raw data in the recording medium after performing image processing. These recording modes are switched by an operation of the operation section 108 by a user.

A description will be first given as to a flow of the recording mode which records the raw data in the recording medium after effecting image processing. After the raw data is obtained in the analog-to-digital converting section 103, this raw data is input to the microcontroller 101 and the image processing section 107. The microcontroller 101 executes white balance (WB) judgment processing based on the input raw data (step S3). This WB judgment processing is processing which acquires information concerning a chromaticity coordinate of a white point in the raw data. This information concerning the chromaticity coordinate of the white point is acquired based on a color temperature of a "white color" in the raw data obtained in imaging, for example. In this example, the obtained information concerning the chromaticity coordinate of the white point is used as image quality information (C) at the time of an image processing parameter calculation which will be carried out later.

After the WB judgment processing at step S3, the image processing section 107 effect simultaneous processing of the raw data (step S4). This simultaneous processing is processing which generates data of three colors R, G and B (the camera RGB data) from the raw data having the Bayer arrangement by interpolation.

Figure 5:
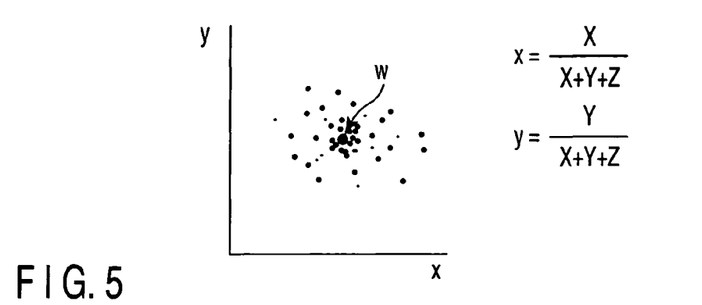
FIG. 5 is a view illustrating white balance adjustment.

After the simultaneous processing at step S4, the image processing section 107 executes white balance (WB) adjustment processing (step S5). This WB adjustment processing is processing which determines a G component in the camera RGB data as a fixed component and applies a predetermined gain (a WB gain value) to an R component and a B component, thereby performing a white balance adjustment of an image. In this example, in order to execute the WB adjustment processing at step S5, the WB gain value for the R component and the B component is required as an image processing parameter. However, since the WB gain value is not information stored in the ROM 106, the image quality information converting section 101a performs processing which converts the image quality information ((A), (B), (C)) into a WB gain value. The image quality information converting section 101a first calculates a product of the Camera RGB-Calibrated RGB conversion matrix (A) and the Calibrated RGB-CIEXYZ conversion matrix (B), and maps the camera RGB onto the CIEXYZ color space (see FIG. 5). Then, a WB gain value is calculated based on the information (C) concerning the chromaticity coordinate of the white point obtained by the WB judgment at step S3.

After the WB adjustment processing at step S5, the image processing section 107 carries out color conversion processing (step S6). This color conversion processing is processing which converts color data after the WB processing (the camera RGB data (WB)) into standard color data (sRGB data in this example). A color of the subject can be substantially correctly reproduced by this color conversion processing. Here, in order to execute the color conversion processing at step S6, a conversion matrix (a color conversion matrix) which is used to convert the camera RGB data into the sRGB data is required as an image processing parameter. However, since the color conversion matrix is not information stored in the ROM 106, processing which converts the image quality information (B) into the color conversion matrix is carried out in the image quality information converting section 101a.

Figure 6:
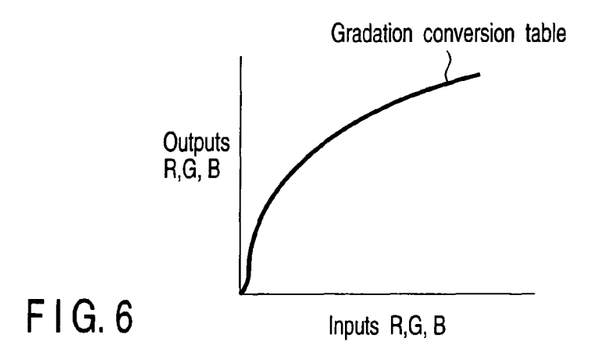
FIG. 6 is a view showing an example of a gradation conversion lookup table.

After the color conversion processing at step S6, the image processing section 107 executes gradation conversion processing (step S7). This gradation conversion processing is processing which converts the RGB data into RGB data having a gradation suitable for display or printing by making reference to such a gradation conversion LUT as shown in FIG. 6. In this example, in order to perform the gradation conversion processing at step S7, the gradation conversion LUT in the RGB color space is required as an image processing parameter. This is actually the gradation conversion LUT (D) stored in the ROM 106.

After the gradation conversion processing at step S7, the image processing section 107 carries out sRGB-YCbCr conversion processing (brightness/color difference conversion processing) (step S8). This sRGB-YCbCr conversion processing is processing which converts color data (the sRGB data) into brightness data and color difference data (the YCbCr data). In this example, a conversion matrix which is used to perform the sRGB-YCbCr conversion processing at step S8 is an intrinsic matrix which is not dependent on an image processing conformation or the like of the image processing section, and has a relationship represented by (Expression 2).

$$Y=0.3R+0.59G+0.11B$$

$$Cr=0.7R-0.59G-0.11B$$

$$Cb=-0.3R-0.59G+0.89B \quad \text{(Expression 2)}$$

wherein R, G and B in (Expression 2) are respective color component data.

After the sRGB-YCbCr conversion processing at step S8, the image processing section 107 executes a color saturation emphasis and hue conversion processing (step S9). In this example, a matrix calculation which amplifies the respective sets of color difference data Cr and Cb by a color saturation emphasis quantity (E) and rotates them by a hue conversion quantity (F) is carried out, thereby adjusting a color saturation and a hue of image data.

Figure 7:
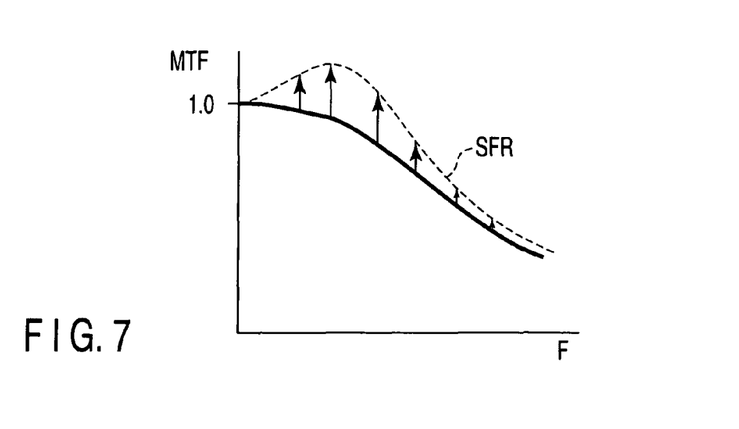
FIG. 7 is a view illustrating band emphasis.

After the color saturation emphasis and the hue conversion processing at step S9, the image processing section 107 performs Y data band emphasis processing (sharpness processing) (step S10). This Y data band emphasis processing is processing which subjects brightness, data Y to a band emphasis based on a predetermined emphasis quantity, thereby emphasizing a contrast of an image. In this example, in order to carry out the band emphasis processing of the Y data at step 10, a band emphasis gain quantity of the Y data is required as an image processing parameter. However, the band emphasis gain quantity of the Y data is not information stored in the ROM 106, and hence processing which converts the image quality information ((G), (H)) into the band emphasis gain quantity of the Y data is carried out in the image quality information converting section 101a. For example, when the lens MTF information (G) of the imaging lens has such characteristics as indicated by a solid line in FIG. 7 and the SFR target value (H) has such characteristics as indicated by a broken line in FIG. 7, the emphasis quantity indicated by arrows in the drawing is the band emphasis gain quantity of the Y data.

After the Y data band emphasis processing at step S10, the image processing section 107 carries out JPEG compression processing to generate JPEG data (step S11). Additionally, header information is added to this JPEG data to generate a JPEG file. Further, the JPEG file is recorded in the recording medium 6 (step S12), thereby terminating the recording processing.

On the other hand, when the recording mode is the recording mode which directly records the raw data in the recording medium 6, the image quality information (A), (B), (D), (E), (F), (G) and (H) recorded in the ROM 106 and the image quality information (C) obtained at the time of imaging are added to the raw data acquired at step S2 to generate a RAW file (step S13). Furthermore, this generated RAW file is recorded in the recording medium 6 (step S14), thereby terminating the recording processing.

As described above, in this embodiment, when information which does not exist as image quality information is required as an image processing parameter, this image processing parameter can be calculated from the image quality information. Moreover, when generating the RAW file, the image processing of the RAW file can be likewise performed in an image processing section other than the camera 100 by recording the image quality information together with the raw data.

That is, as different from the image quality information to be recorded in the conventional technique, appropriate image processing for the image processing apparatus can be effected regardless of image processing conformation. Further, it is possible to exploit the primary utility value of the raw data, i.e., enabling an improvement in image quality with an advance of the image processing technique by this embodiment.

Figure 8:
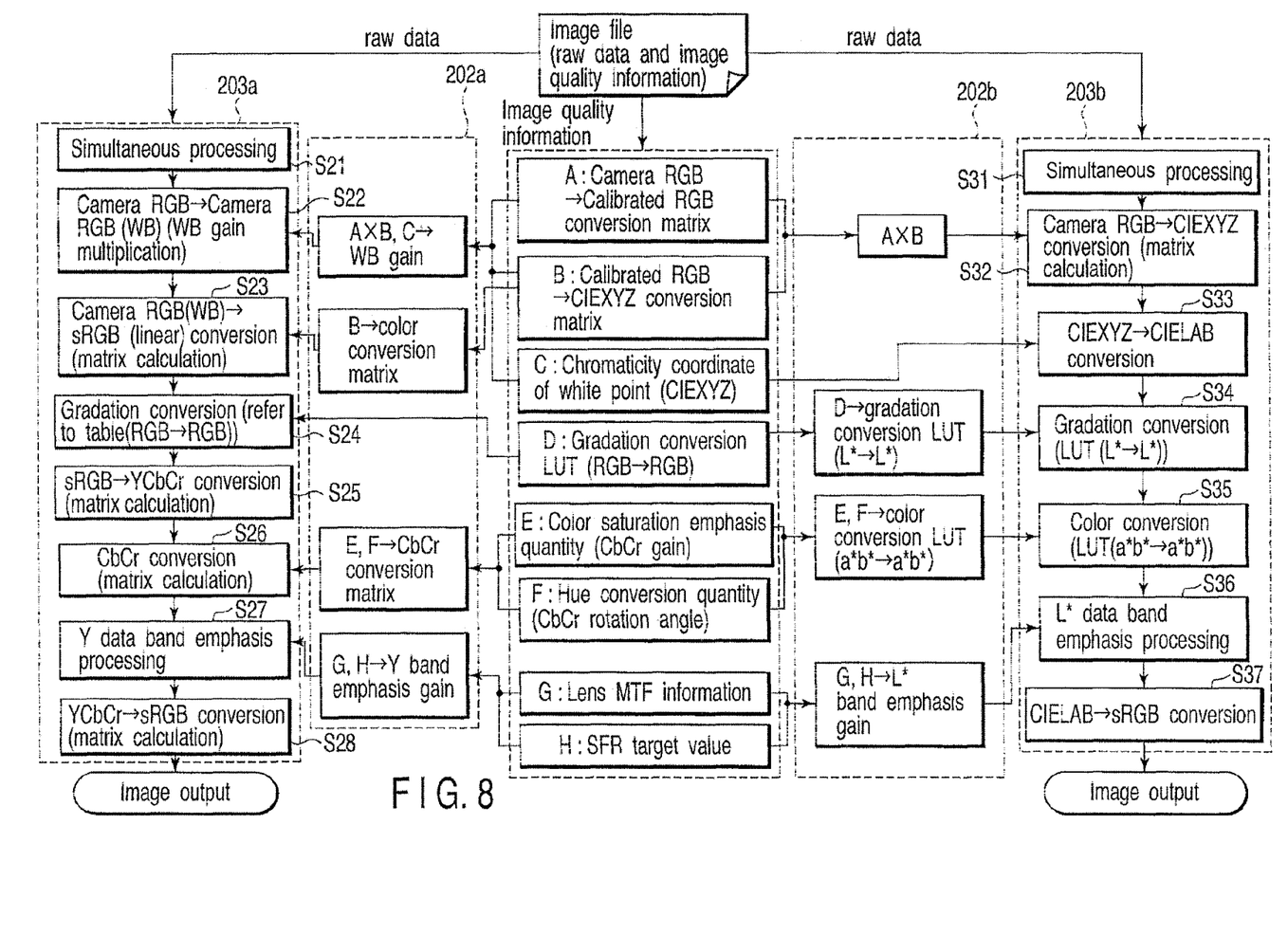
FIG. 8 is a flowchart showing the flow when performing image processing with respect to a RAW file on an image processing apparatus side.

A description will now be given as to a flow of performing image processing on an image processing apparatus 200 side with respect to a RAW file generated by such image recording processing as shown in FIG. 4 with reference to FIG. 8. As described above, when a raw file is input to the image processing apparatus 200, raw data is input to an image processing engine selected by a user, and image quality information is input to an image quality information converting section corresponding to this image processing engine.

Image processing on an image processing engine 203a side will be first described. Here, an image processing conformation of the'image processing engine 203a is similar to the image processing conformation of the image processing section 107 of the camera 100, and an only difference of this image processing conformation from that of the above-described example lies in that final output data is color data rather than the brightness/color difference data. The explanation of the processing from step S21 to step S27 which is the same as the processing of the image processing section 107 will be eliminated. After the Y data band emphasis processing at step S27, the image processing engine 203a performs YCbCr-sRGB conversion processing (step S28). This YCbCr-sRGB conversion processing is processing which performs inverse conversion of the brightness/color difference conversion processing in order to convert YCbCr data into sRGB data. As a result, an image can be output for display or printing.

Image processing on an image processing engine 203b side will now be described. This image processing engine 203b has an image processing conformation which is largely different from that of the image processing engine 203a or the image processing section 107 on the camera side.

First, the image processing engine 203b effects simultaneous processing (step S31). Then, it carries out Camera RGB-CIEXYZ processing (step S32). A conversion matrix which is used in the conversion processing at step S32 is obtained by a product of the Camera RGB-Calibrated RGB conversion matrix (A) and the Calibrated RGB-CIEXYZ conversion matrix (B).

After the color conversion processing at step S32, the image processing engine 203b performs CIEXYZ-CIELAB conversion processing (step S33). This CIEXYZ-CIELAB conversion processing is processing which maps data mapped onto the CIEXYZ color space onto a CIELAB color space. In this example, the CIELAB color space is one of uniform color spaces. In this CIELAB color space, a color difference which seems to have a uniform size corresponds to a uniform distance in the space. In this example, a transformation required to perform the CIEXYZ-CIELAB conversion has a relationship of (Expression 3) irrespective of an image processing conformation of the image processing section.

$$L^* = 116\left(\frac{Y}{Yn}\right)^{1/3} - 16$$ (Expression 3)

$$a^* = 500\left(\left(\frac{X}{Xn}\right)^{1/3} - \left(\frac{Y}{Yn}\right)^{1/3}\right)$$

$$b^* = 200\left(\left(\frac{Y}{Yn}\right)^{1/3} - \left(\frac{Z}{Zn}\right)^{1/3}\right)$$

where Y/Yn>0.008856, X/Xn>0.008856, Z/Zn>0.008856. In this expression, L* is a lightness index, a* and b* are chromaticness indices, and X, Y and Z are tristimulus values in an XYZ color specification system (i.e., data after the Calibrated RGB-CIEXYZ conversion at step S32). Furthermore, Xn, Yn and Zn are tristimulus values of a perfect diffuse reflection surface (i.e., information (C) concerning the chromaticity coordinate of the white point). However, (Expression 3) has a relationship which is achieved only when X/Xn, Y/Yn and Z/Zn are larger than 0.008856. If any of X/Xn, Y/Yn and Z/Zn has a value which is not greater than 0.008856, a corresponding term of a cubic root in (Expression 3) is substituted in accordance with a relationship of (Expression 4), and then the conversion is performed.

$$\left(\frac{X}{Xn}\right)^{1/3} \rightarrow 7.787\left(\frac{X}{Xn}\right) + \frac{16}{116}$$ (Expression 4)

$$\left(\frac{Y}{Yn}\right)^{1/3} \rightarrow 7.787\left(\frac{Y}{Yn}\right) + \frac{16}{116}$$

$$\left(\frac{Z}{Zn}\right)^{1/3} \rightarrow 7.787\left(\frac{Z}{Zn}\right) + \frac{16}{116}$$

Here, when performing the CIEXYZ-CIELAB conversion processing at step S33, the information (C) concerning the chromaticity coordinate of the white point is required. Therefore, data obtained as a result of the CIEXYZ-CIELAB conversion processing is data with the white balance being adjusted.

After the CIEXYZ-CIELAB conversion processing at step S33, the image processing engine 203b carries out gradation conversion processing (step S34). In this example, the gradation conversion processing is performed with respect to the lightness (i.e., L*) only. In order to realize this, the image quality information converting section 202b effects processing which converts the image quality information (D) into a gradation conversion LUT for the CIELAB color space. This can be carried out by making reference to a lookup table which is used to calculate the gradation conversion LUT for the CIELAB color space from the gradation conversion LUT (D) for the RGB color space.

After the gradation conversion processing at step S34, the image processing engine 203b performs color conversion processing (step S35). The processing at this step is carried out by making reference to the lookup table for color conversion. In order to realize this, the image quality information converting section 202b executes processing which converts the image quality information ((E), (F)) into a color conversion LUT for the CIELAB color space.

After the color conversion processing at step S35, the image processing engine 203b executes L* data band emphasis processing (step S36). This L* data band emphasis processing is processing which performs band emphasis of the lightness data L* in order to emphasize a contrast of an image. Thus, the image quality information converting section 202b performs processing which converts the image quality information ((G), (H)) into an L* band emphasis gain quantity.

After the L* data band emphasis processing at step S36, the image processing engine 203b effects CIELAB-sRGB conversion processing (step S37). This is also the conversion which is not dependent on an image processing conformation.

As described above, in this embodiment, the image quality information which can be converted into image processing parameters can be recorded together with the raw data. Moreover, since the image quality information can be converted into an image processing parameter corresponding to an image processing conformation as required by providing the image quality information converting section, the image processing of the raw data can be performed irrespective of an image processing conformation of the image processing section. As a result, for example, even when an image processing section having an image processing conformation superior to that of an existing image processing section is developed, an image quality of an image recorded in an image recording apparatus can be improved by just providing an image quality information converting section corresponding to this image processing section.

Here, as the image quality information in the foregoing embodiment, basic information such as apparatus characteristic information of the imaging section and image quality target information which is used to obtain a standard image quality is used. However, the image quality information used in this example is just an example, and this information may be increased or decreased as required.

Additionally, one image processing section and one image quality information converting section are provided in the image recording apparatus of the foregoing embodiment, but it is needless to say that the number of each of these sections may be two or above. In such a case, a selective switch section described in conjunction with the image processing apparatus is provided. Further, when recording the raw data only, the image processing section and the image quality information converting section do not have to be provided on the image recording apparatus side.

Furthermore, one image processing section and one image quality information converting section may be provided on the image processing apparatus side.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image processing system comprising:
a first image processing apparatus comprising:
a first image file input section which receives an image file from outside the first image processing apparatus, the image file including raw data as imaging data and image quality information associated with the raw data, the image quality information including at least one color conversion matrix being converted into image processing parameters for performing image processing with respect to the raw data in a color space corresponding to one of (A) sRGB color space and (B) CIEXYZ color space, and chromaticity coordinate of a white point in the raw data;
a first image processing section which performs:
simultaneous processing which performs simultaneous processing with respect to the raw data received in the first image input section to obtain first simultaneous RGB data;
white balance adjustment processing which uses a color conversion matrix for mapping simultaneous RGB data included in the image quality information onto a CIEXYZ color space to obtain first CIEXYZ data by performing color space conversion with respect to the first simultaneous RGB data, and calculates a white balance gain using the chromaticity coordinate of the white point to perform white balance adjustment with respect to the first CIEXYZ data using the white balance gain;
first sRGB conversion processing which uses a color conversion matrix for converting CIEXYZ data included in the image quality information into sRGB data, which is standard color data, to convert the first CIEXYZ data subjected to the white balance adjustment into first sRGB data;
gradation conversion processing which performs gradation conversion with respect to the first sRGB data to obtain gradation converted sRGB data;
brightness/color difference conversion processing which converts the gradation converted sRGB data into brightness data and color difference data;
color saturation emphasis and hue conversion processing which adjusts color saturation and hue of the color difference data;
first band emphasis processing which performs band emphasis with respect to the brightness data based on a predetermined band emphasis quantity; and
second sRGB conversion processing which converts color difference data which is corrected the color saturation and hue and brightness data to which the band emphasis is performed into second sRGB image data; and
a first image output section which outputs the second sRGB image data;
a second image processing apparatus comprising:
a second image file input section which receives an image file from outside the second image processing apparatus;
a second image processing section which performs:
a second simultaneous processing which performs simultaneous processing with respect to the raw data received in the second image input section to obtain second simultaneous RGB data;
CIEXYZ conversion processing which uses a color conversion matrix for mapping simultaneous RGB data included in the image quality information onto a CIEXYZ color space to obtain second CIEXYZ data by performing color space conversion with respect to the second simultaneous RGB data;
CIEXYZ-to-CIELab conversion processing which uses chromaticity coordinate of the white point to obtain CIElab data by performing color conversion with respect to the second CIEXYZ data;
gradation conversion processing which performs gradation conversion with respect to lightness data of the CIELab data to obtain gradation converted lightness data;
color conversion processing which performs color conversion with respect to chromaticness data of the CIELab data using a color conversion lookup table for a CIELAB color space;
second band emphasis processing which performs band emphasis with respect to the gradation converted lightness data; and
third sRGB conversion processing which converts CIELab data including band emphasized lightness data and the color converted chromaticness data into third sRGB image data; and
a second image output section which outputs the third sRGB image data and
a hardware selector for selecting one of the first image processing apparatus and the second image processing apparatus.

2. The image processing system according to claim 1, wherein the raw data and the image quality information are recorded as one file.

3. The image processing system according to claim 1, wherein the image quality information includes information concerning a frequency response of an imaging lens.

4. The image processing system according to claim 1, wherein the information concerning the image quality target includes at least one of information concerning a color saturation emphasis quantity in a specific color space, information concerning a hue conversion quantity in the specific color space, and information concerning gradation conversion processing with respect to raw imaging data.

5. The image processing system according to claim 1, wherein the first and second image processing apparatuses use a camera RGB to calibrated RGB conversion matrix, a calibrated RGB to CIEXYZ conversion matrix, and a gradation conversion LUT.

6. The image processing system according to claim 1, wherein the first and second image processing apparatuses use a camera RGB to calibrated RGB conversion matrix.

7. The image processing system according to claim 1, wherein the first and second image processing apparatuses use a calibrated RGB to CIEXYZ conversion matrix.

8. The image processing system according to claim 1, wherein the first and second image processing apparatuses use a gradation conversion LUT.

9. An image processing system comprising:
an image file input section which receives an image file from outside the image processing system, the image file including raw data as imaging data and image quality information associated with the raw data, the image quality information including at least one color conversion matrix being converted into image processing parameters for performing image processing with respect to the raw data in a color space corresponding to one of (A) sRGB color space and (B) CIEXYZ color space, and chromaticity coordinate of a white point in the raw data;
a first image processing apparatus configured to perform, in response to receiving the image file as input from the image file input section, a first image processing corresponding to the sRGB color space; and
a second image processing apparatus configured to perform, in response to receiving the image file as input from the image file input section, a second image processing corresponding to the Lab color space,
wherein the first image processing includes
 simultaneous processing which performs simultaneous processing with respect to the raw data received in the first image input section to obtain first simultaneous RGB data,
 white balance adjustment processing which uses a color conversion matrix for mapping simultaneous RGB data included in the image quality information onto a CIEXYZ color space to obtain first CIEXYZ data by performing color space conversion with respect to the first simultaneous RGB data, and calculates a white balance gain using the chromaticity coordinate of the white point to perform white balance adjustment with respect to the first CIEXYZ data using the white balance gain,
 first sRGB conversion processing which uses a color conversion matrix for converting CIEXYZ data included in the image quality information into sRGB data, which is standard color data, to convert the first CIEXYZ data subjected to the white balance adjustment into first sRGB data,
 gradation conversion processing which performs gradation conversion with respect to the first sRGB data to obtain gradation converted sRGB data,
 brightness/color difference conversion processing which converts the gradation converted sRGB data into brightness data and color difference data,
 color saturation emphasis and hue conversion processing which adjusts color saturation and hue of the color difference data,
 first band emphasis processing which performs band emphasis with respect to the brightness data based on a predetermined band emphasis quantity, and
 second sRGB conversion processing which converts color difference data which is corrected the color saturation and hue and brightness data to which the band emphasis is performed into second sRGB image data, and
wherein the second image processing includes
 a second simultaneous processing which performs simultaneous processing with respect to the raw data received in the second image input section to obtain second simultaneous RGB data,
 CIEXYZ conversion processing which uses a color conversion matrix for mapping simultaneous RGB data included in the image quality information onto a CIEXYZ color space to obtain second CIEXYZ data by performing color space conversion with respect to the second simultaneous RGB data,
 CIEXYZ-to-CIELab conversion processing which uses chromaticity coordinate of the white point to obtain CIElab data by performing color conversion with respect to the second CIEXYZ data,
 gradation conversion processing which performs gradation conversion with respect to lightness data of the CIELab data to obtain gradation converted lightness data,
 color conversion processing which performs color conversion with respect to chromaticness data of the CIELab data using a color conversion lookup table for a CIELAB color space,
 second band emphasis processing which performs band emphasis with respect to the gradation converted lightness data, and
 third sRGB conversion processing which converts CIELab data including band emphasized lightness data and the color converted chromaticness data into third sRGB image data; and
a hardware selector for selecting one of the first image processing apparatus and the second image processing apparatus.

10. The image processing system of claim 9, wherein the first image processing apparatus further includes an image output section which outputs the second sRGB image data.

11. The image processing system of claim 9, wherein the second image processing apparatus further includes an image output section which outputs the third sRGB image data.

* * * * *